(12) United States Patent
Sylvain et al.

(10) Patent No.: US 7,899,164 B2
(45) Date of Patent: Mar. 1, 2011

(54) CONVERGENCE OF CIRCUIT-SWITCHED VOICE AND PACKET-BASED MEDIA SERVICES

(75) Inventors: Dany Sylvain, Gatineau (CA); Raheel Yuhanna, Dallas, TX (US); R. Alberto Villarica, Dallas, TX (US); Gregory Osterhout, Coppell, TX (US); Craik R. Pyke, Nepean (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1973 days.

(21) Appl. No.: 10/746,432

(22) Filed: Dec. 24, 2003

(65) Prior Publication Data

US 2004/0258050 A1    Dec. 23, 2004

Related U.S. Application Data

(60) Provisional application No. 60/479,715, filed on Jun. 19, 2003.

(51) Int. Cl.
*H04M 11/00* (2006.01)
(52) U.S. Cl. .................... 379/93.23; 379/88.13
(58) Field of Classification Search .......... 379/93.23, 379/88.13, 88.17, 93.01, 202.01, 204.01, 379/205.01, 93.21, 158; 370/261, 265
See application file for complete search history.

(56) References Cited

U.S. PATENT DOCUMENTS

| | | | |
|---|---|---|---|
| 5,742,670 A | 4/1998 | Bennett | |
| 5,915,008 A | 6/1999 | Dulman | |
| 5,949,763 A * | 9/1999 | Lund | 370/261 |
| 6,134,235 A | 10/2000 | Goldman et al. | |
| 6,430,176 B1 * | 8/2002 | Christie, IV | 370/355 |
| 6,438,599 B1 | 8/2002 | Chack | 709/229 |
| 6,470,008 B1 * | 10/2002 | Khuc | 370/352 |
| 6,549,621 B1 | 4/2003 | Christie, IV et al. | |
| 6,600,735 B1 | 7/2003 | Iwama et al. | |
| 6,665,390 B1 * | 12/2003 | Ekstrom | 379/201.01 |
| 6,704,294 B1 | 3/2004 | Cruickshank | |

(Continued)

FOREIGN PATENT DOCUMENTS

EP    0 721 266    7/1996

(Continued)

OTHER PUBLICATIONS

International Search Report for PCT/IB2004/002046 mailed Dec. 30, 2004.

*Primary Examiner*—Olisa Anwah
(74) *Attorney, Agent, or Firm*—Withrow & Terranova, PLLC

(57) ABSTRACT

In one embodiment, a service node will recognize an attempt to initiate a call from a first terminal to a second terminal, and automatically provide information to media clients associated with the first and second terminals such that a media session can be readily established between the media clients in association with the call. The service node may be configured to interact with telephony switches that support the first or second terminals, directly or indirectly via a signaling adaptor. In a second embodiment, the service node will recognize an attempt to initiate a call and will route the call to a gateway, which is controllable by the service node. Once the call is sent to the gateway, the service node may provide instructions to the gateway for routing or otherwise processing the call.

35 Claims, 13 Drawing Sheets

U.S. PATENT DOCUMENTS

| | | | |
|---|---|---|---|
| 6,807,423 B1 * | 10/2004 | Armstrong et al. | 455/440 |
| 6,987,765 B2 * | 1/2006 | March et al. | 370/392 |
| 7,035,260 B1 * | 4/2006 | Betta et al. | 370/392 |
| 7,039,043 B2 * | 5/2006 | Sugihashi et al. | 370/355 |
| 7,058,068 B2 * | 6/2006 | Gawargy et al. | 370/410 |
| 7,099,288 B1 * | 8/2006 | Parker et al. | 370/259 |
| 7,158,509 B2 | 1/2007 | Beyda | |
| 7,283,154 B2 | 10/2007 | Shachar et al. | |
| 7,356,137 B1 * | 4/2008 | Burg et al. | 379/211.01 |
| 7,385,963 B1 | 6/2008 | Carew et al. | |
| 7,443,834 B1 | 10/2008 | Sylvain | |
| 7,548,536 B1 * | 6/2009 | Alexander et al. | 370/352 |
| 2001/0006519 A1 | 7/2001 | Voit | |
| 2001/0056466 A1 * | 12/2001 | Thompson et al. | 709/204 |
| 2003/0026413 A1 * | 2/2003 | Brandt et al. | 379/230 |
| 2003/0088619 A1 | 5/2003 | Boundy | |
| 2003/0210678 A1 * | 11/2003 | Haukka | 370/352 |
| 2004/0062230 A1 | 4/2004 | Taylor et al. | |
| 2004/0120498 A1 * | 6/2004 | Sylvain | 379/221.01 |
| 2004/0174975 A1 | 9/2004 | Sylvain et al. | |
| 2004/0258050 A1 | 12/2004 | Sylvain et al. | |
| 2006/0250989 A1 * | 11/2006 | Wengrovitz | 370/260 |

FOREIGN PATENT DOCUMENTS

| | | |
|---|---|---|
| EP | 0 999 712 | 5/2000 |
| EP | 0 999 712 A2 * | 5/2000 |
| WO | 00/72535 | 11/2000 |
| WO | 01/35602 | 5/2001 |

* cited by examiner

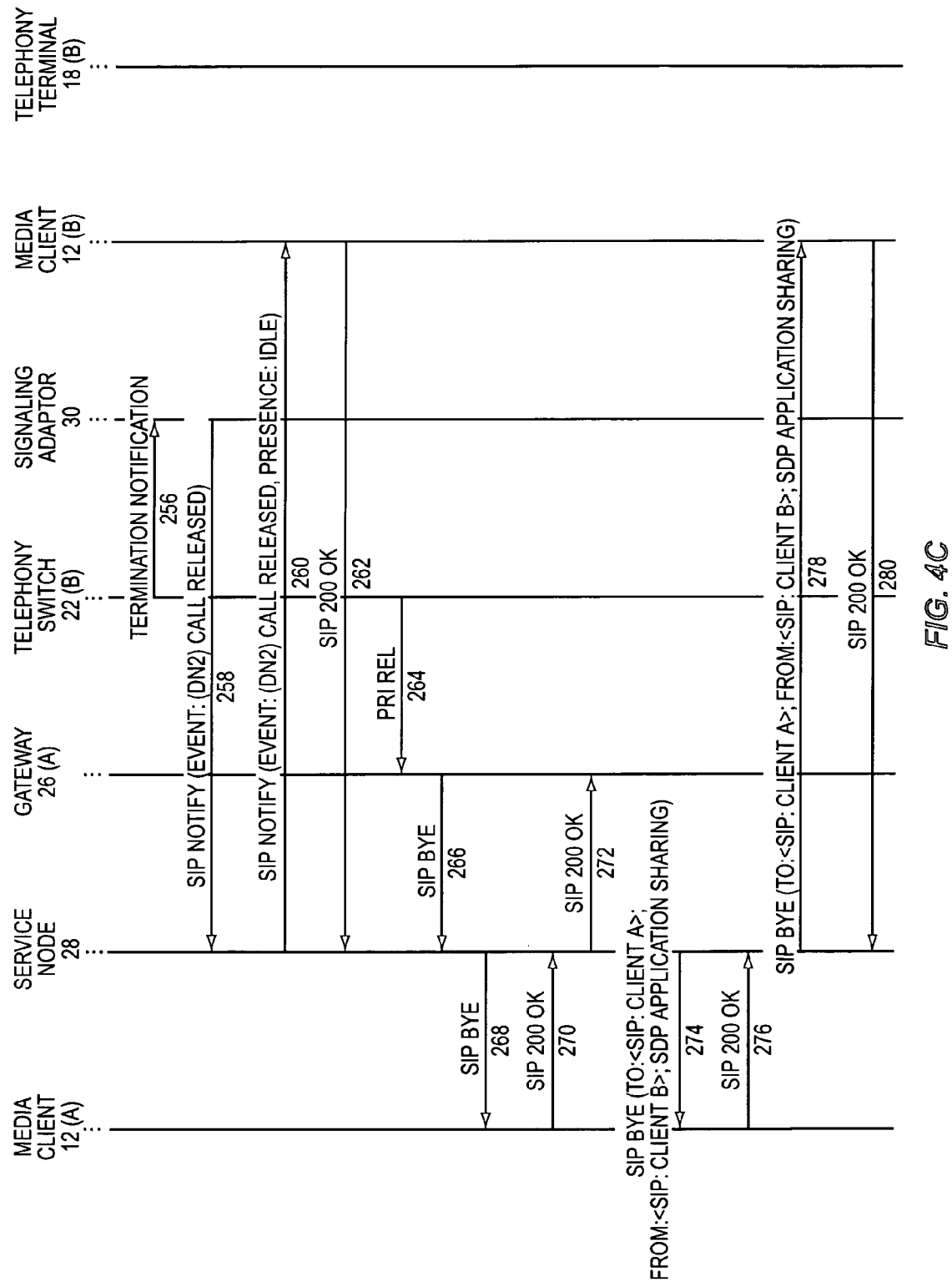

CONVERGENCE OF CIRCUIT-SWITCHED VOICE AND PACKET-BASED MEDIA SERVICES

This application claims the benefit of U.S. provisional patent application Ser. No. 60/479,715, filed Jun. 19, 2003, the disclosure of which is hereby incorporated by reference in its entirety.

CROSS-REFERENCE TO RELATED APPLICATIONS

This application is related to currently pending U.S. patent application Ser. No. 10/746,419, filed on Dec. 24, 2003 entitled CONVERGENCE OF CIRCUIT-SWITCHED VOICE AND PACKET-BASED MEDIA SERVICES, the disclosure of which is incorporated herein by reference in its entirety.

FIELD OF THE INVENTION

The present invention relates to communications, and in particular to associating traditional circuit-switched voice calls with multimedia services provided over a packet network.

BACKGROUND OF THE INVENTION

The rapid acceptance and growth of packet-based networks has led to the development of numerous multimedia services, which are beneficial in both residential and business contexts. These multimedia services include application sharing, video conferencing, media streaming, gaming, and the like. These multimedia services are predominantly provided over packet-based networks between various media clients, which are generally implemented on a personal computer. Most of these multimedia services benefit when a voice connection is concurrently established between the end users. In a video conferencing environment, the conferencing parties need a voice connection to enable the conversation, yet may require media sessions to provide the associated video or share application information between the conferencing parties. Although packet-based networks are sufficient to facilitate the multimedia services, the corresponding voice connection is generally set up independently over a circuit-switched network. To date, packet-based voice sessions generally do not provide the level of quality or reliability as that provided by the circuit-switched networks. Thus, the end users of a multimedia session will generally independently set up a voice call to correspond to their multimedia sessions, wherein there is no association between the multimedia sessions and the voice call.

Given the ever-increasing popularity of multimedia sessions and the desire to have an associated voice call over a circuit-switched network, there is a need for an efficient and effective technique for automatically associating packet-based multimedia sessions and voice calls over a circuit-switched network. There is a further need for a technique to control these multimedia sessions and circuit-switched voice calls in a centralized fashion, wherein establishing a voice call will automatically result in configuring corresponding media clients to prepare for establishing a corresponding multimedia session, and vice versa. There is also a need for a user interface that provides centralized control of the voice calls and multimedia sessions, such that the user can readily control the voice calls and multimedia services, as well as receive information pertaining thereto.

SUMMARY OF THE INVENTION

The present invention provides a service node to assist in routing circuit-switched or packet-based calls to support voice communications. In one embodiment, the service node will recognize an attempt to initiate a call from a first terminal to a second terminal, and automatically provide information to media clients associated with the first and second terminals such that a media session can be readily established between the media clients in association with the call. The media session may support any type of service. The service node may be configured to interact with telephony switches that support the first or second terminals, directly or indirectly via a signaling adaptor. The signaling adaptor will provide the necessary message conversion from a first protocol used to communicate with the telephony switch to a second protocol used to communicate with the service node. In a second embodiment, the service node will recognize an attempt to initiate a call and will route the call to a gateway, which is controllable by the service node. Once the call is sent to the gateway, the service node may provide instructions to the gateway for routing or otherwise processing the call. In either embodiment, the service node may include call routing logic, which is defined by a user of one of the terminals or media clients to control how the call is processed.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIGS. 2A-2C provide a communication flow for establishing a voice call over a circuit-switched network and a multimedia session over a packet network in association with one another according to one embodiment of the present invention.

FIG. 3 is a block representation of a communication environment according to a second embodiment of the present invention.

FIGS. 4A-4C provide a communication flow for establishing a voice call over a circuit-switched network and a multimedia session over a packet network from a single multimedia client according to one embodiment of the present invention.

FIG. 5 is a communication environment according to a third embodiment of the present invention.

FIGS. 6A-6C provide a communication flow illustrating an exemplary call routing process according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
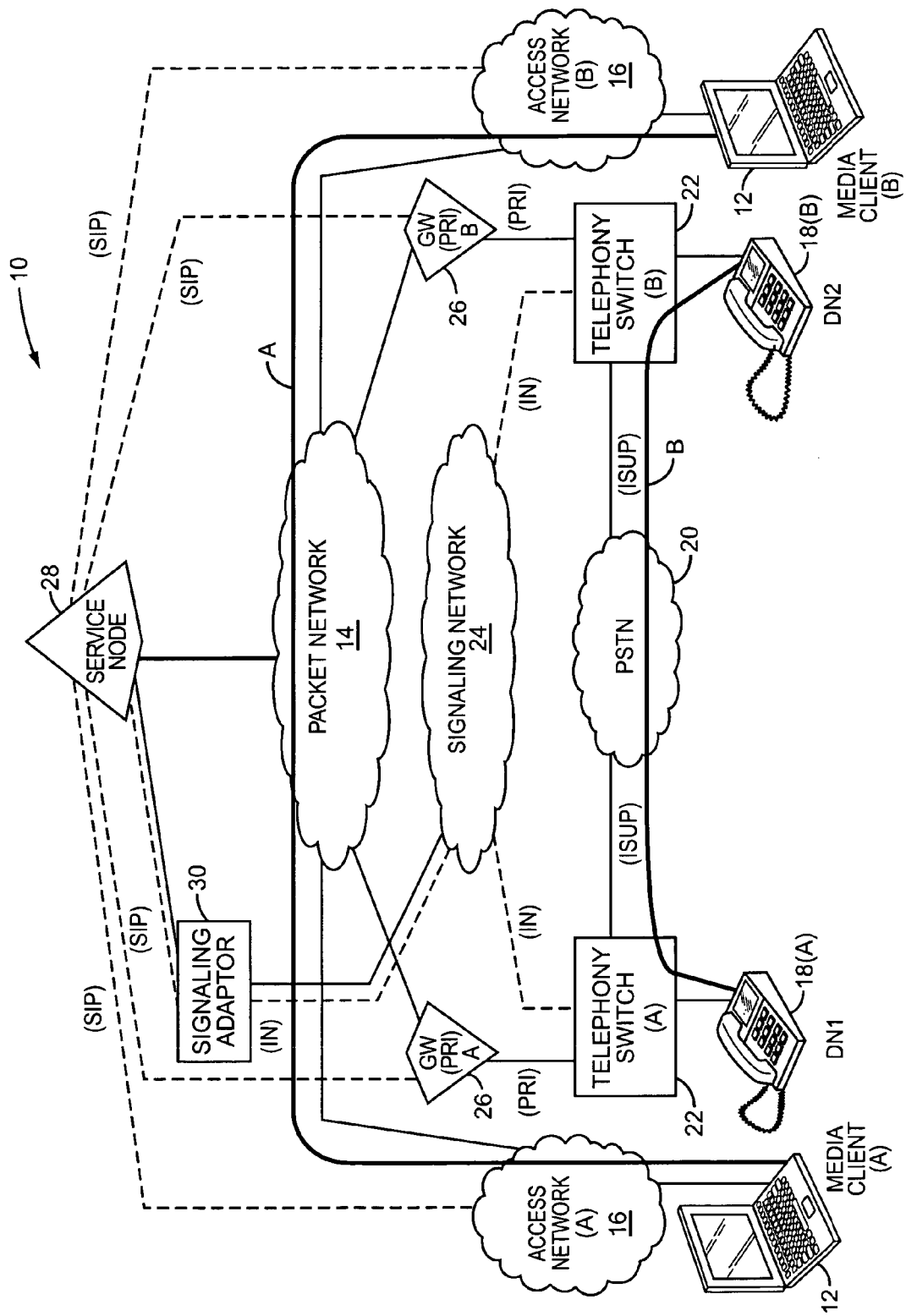

The present invention facilitates control and association of voice sessions and multimedia sessions for multimedia services. With reference to FIG. 1, a communication environment 10 in which voice calls and multimedia sessions may be associated is illustrated according to a first embodiment. In general, end users will have corresponding media clients 12 (A and B), which may take the form of a personal computer, personal digital assistant, or like computing device, and may be configured to establish a multimedia session (A) with each other over a centralized packet network 14 and the corresponding access networks 16 (A and B). The end users will also be associated with telephony terminals 18 (A and B), which are capable of establishing voice calls (B) therebetween over the Public Switched Telephone Network (PSTN) 20 via the corresponding telephony switches 22 (A and B). Those skilled in the art will recognize that the telephony switches 22 may support wired or wireless communications in a circuit-switched or packet-based fashion.

A signaling network 24 is used to provide call signaling to the telephony switches 22 to establish and tear down circuit-switched connections between the telephony switches 22 to support the voice call over the PSTN 20. The signaling network 24 may take the form of a Signaling Systems 7 (SS7) network. The telephony switches 22 may also be associated with corresponding gateways 26 (A and B), which may facilitate a portion of a voice call over the packet network 14. The gateways 26 will effectively facilitate interworking between the PSTN 20 or telephony switches 22 and the packet network 14, wherein circuit-switched connections are transformed into packet sessions, and vice versa. As illustrated, the gateway 26 will have a packet interface for communicating with the packet network 14, and a telephony interface, such as a Primary Rate Interface (PRI) for facilitating a circuit-switched connection with the telephony switch 22. Further detail regarding the operation of the gateways 26 (A and B) will be provided in association with other embodiments, which are described later in this specification.

To facilitate the association of the voice call and the multimedia session, a service node 28 is provided to communicate with the media clients 12 to assist in the establishment and control of the media session, as well as provide call signaling to assist in the control of the voice call. The service node 28 may communicate with the media clients 12 through the packet network 14 and the associated access network 16 using the Session Initiation Protocol (SIP) or like media session control protocol. The service node 28 may communicate with call control entities in the signaling network 24, the telephony switches 22, and the gateways 26, directly or indirectly, using SIP or like session control protocol. In the illustrated embodiment, the service node 28 can use SIP to communicate with the gateways 26 and the multimedia clients 12 in a direct manner, whereas a signaling adaptor 30 is used to convert SIP messages to Intelligent Network (IN) protocol messages to control call control entities in the signaling network 24 or the telephony switches 22. In essence, the signaling adaptor 30 will convert SIP messages to appropriate IN messages, and vice versa, to effectively control the voice call established between the telephony terminals 18. In other embodiments, the service node 28 will use SIP to communicate with the gateways 26 to provide enhanced call processing functions. Thus, the service node 28 may interact with the signaling adaptor 30 to facilitate IN signaling to the telephony switches 22 via the signaling network 24 to provide call signaling, and the telephony switches 22 may communicate with each other using the Integrated Services User Part (ISUP) protocol to establish a bearer channel over the PSTN 20 for the voice call. Those skilled in the art will recognize other call control and messaging protocols that may be substituted for those specifically depicted.

Figure 2A:
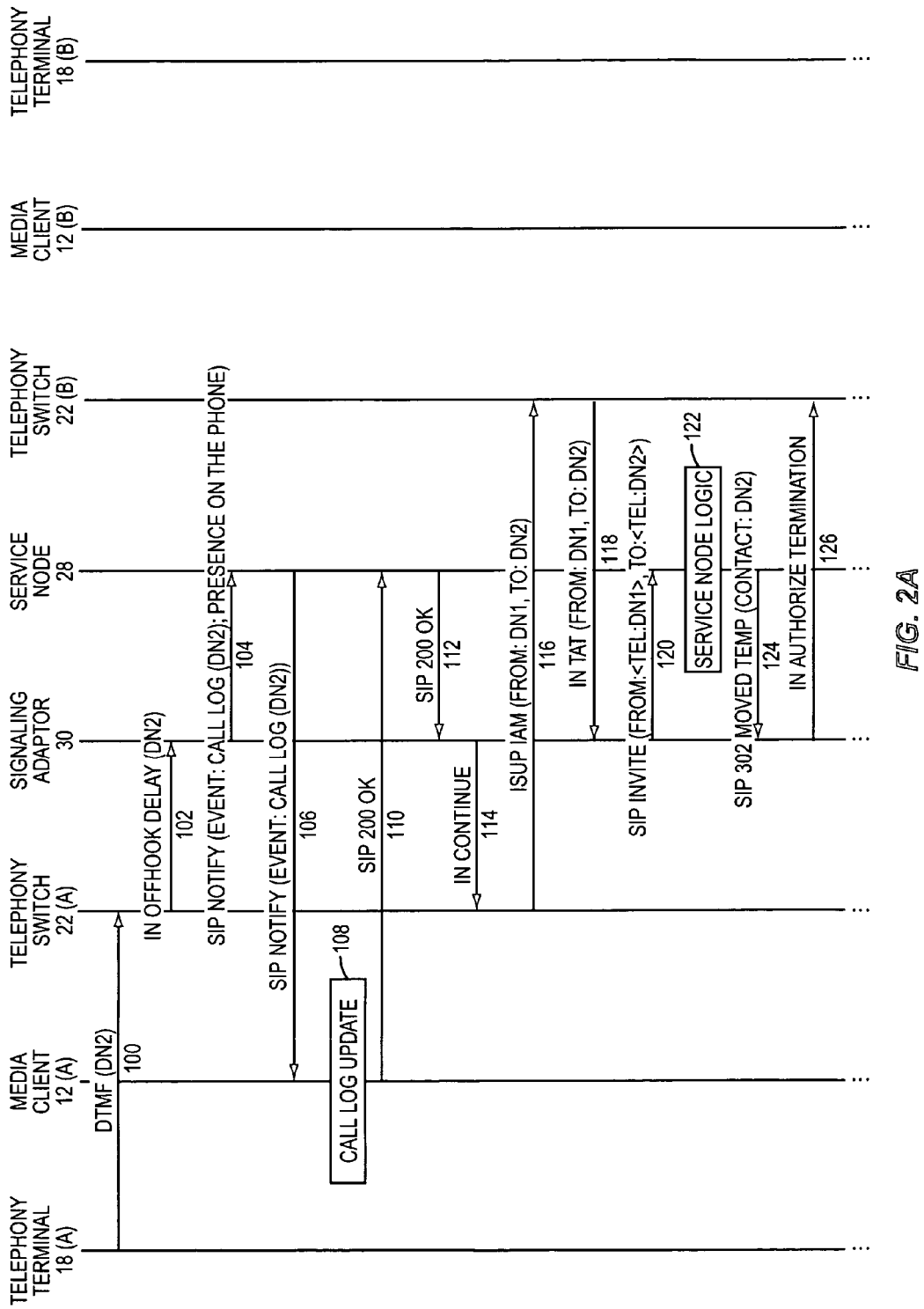
Figure 2B:
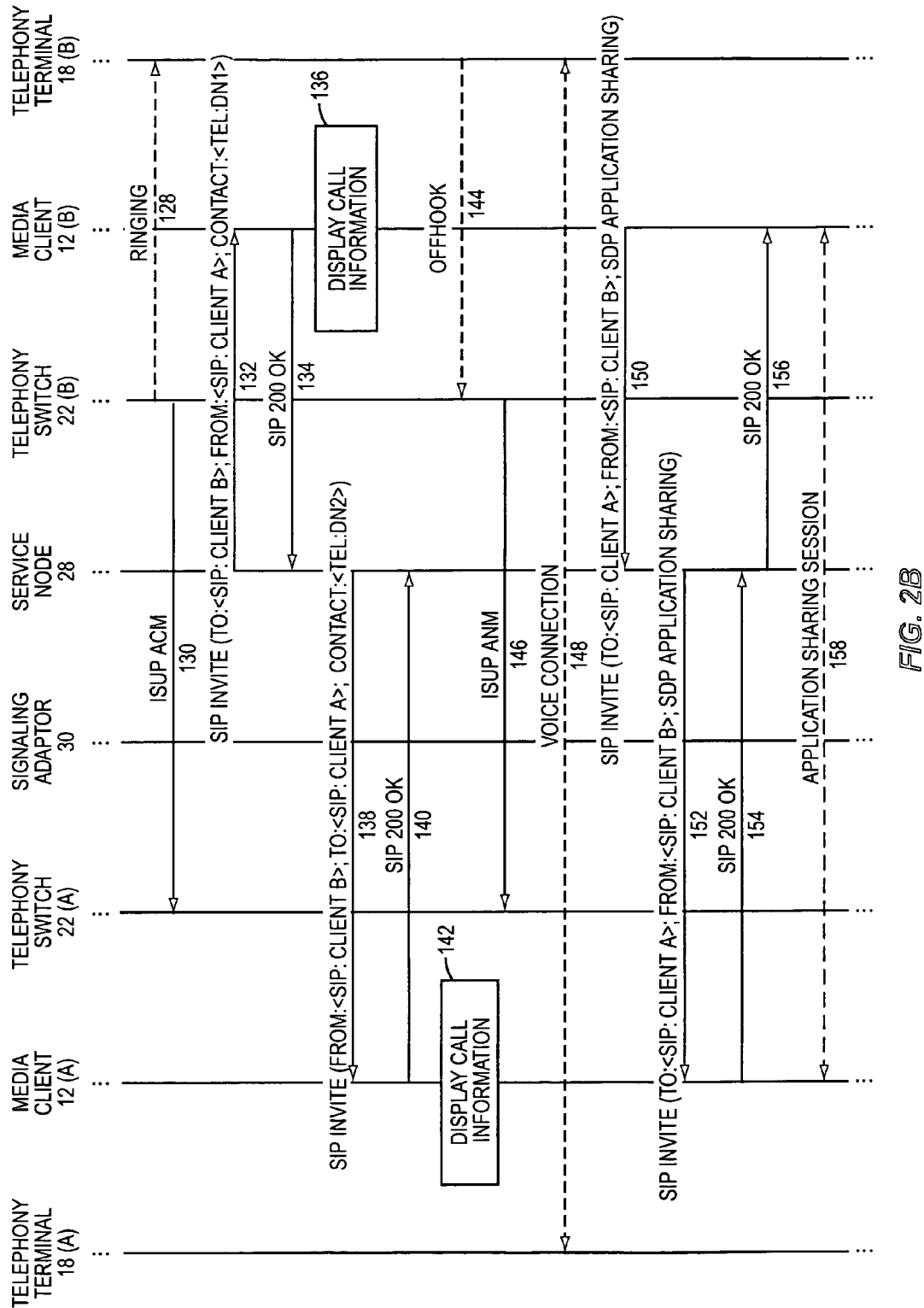
Figure 2C:
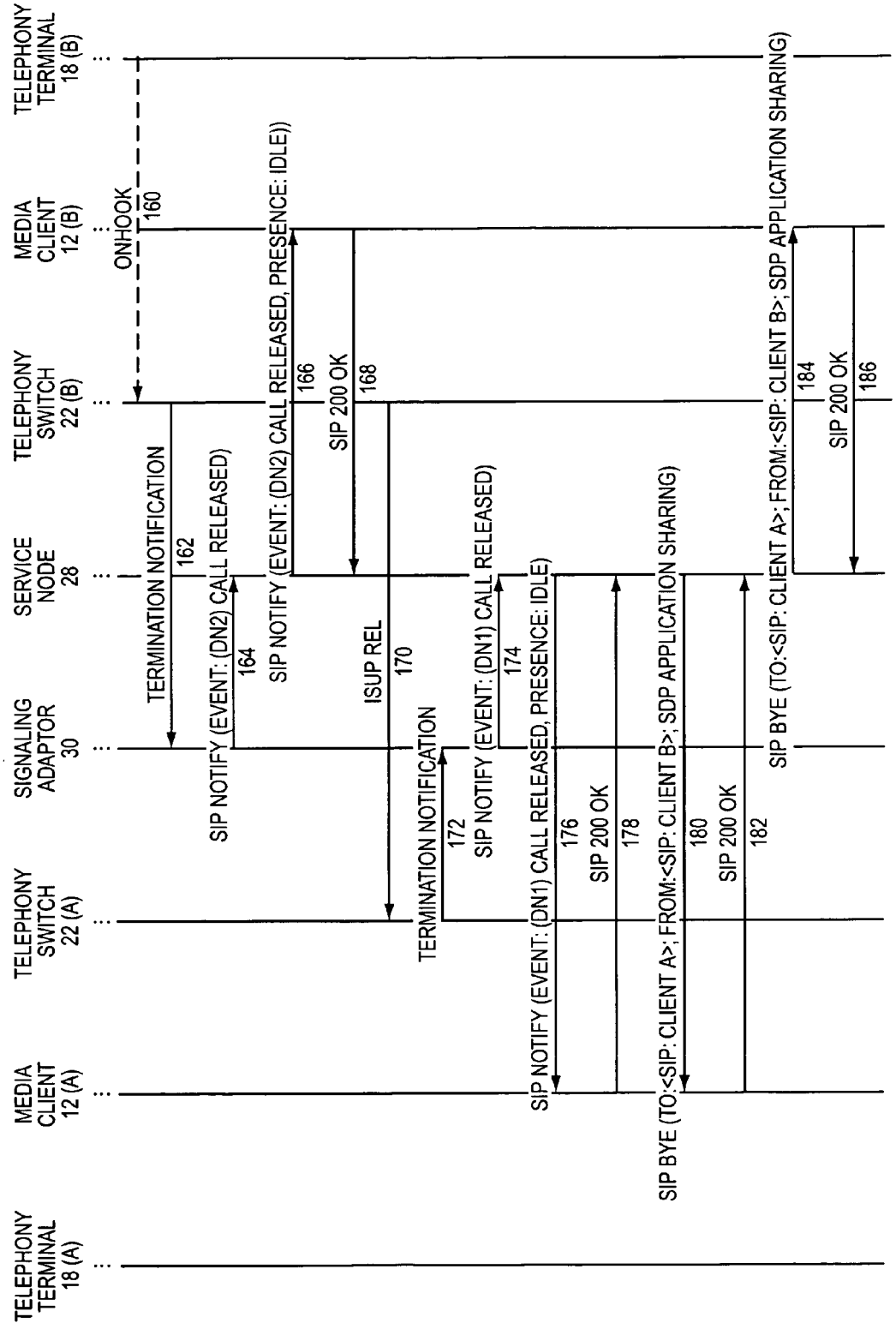

With reference to FIGS. 2A-2C, an exemplary communication flow is provided to illustrate how the service node 28 may function to assist in the establishment of a voice call and an associated media session. The voice call is established between the telephony terminals 18 (A and B) and the media session is established between media clients 12 (A and B). Initially, assume telephony terminal 18A, which is associated with directory number DN1, initiates a call to telephony terminal 18B by dialing directory number DN2, using a traditional Dual Tone Multi-frequency (DTMF) tone sequence. Telephony switch 22A will receive the DTMF digits corresponding to directory number DN2 (step 100) and recognize that calls originating from telephony terminal 18A require the call control assistance of the service node 28. As such, telephony switch 22A may be provisioned to send an IN Offhook Delay message toward the service node 28. When a signaling adaptor 30 is employed, the IN Offhook Delay trigger will be received by the signaling adaptor 30 (step 102), which will convert it into a corresponding SIP Notify message, which is sent to the service node 28 (step 104). The SIP Notify message will identify the event that triggered the message and the directory number (DN2) for the called party. The service node 28 may provide various levels of control, including keeping track of presence information associated with telephony terminal 18A, updating call logs, and controlling the call being initiated.

If the service node 28 keeps track of presence information, which is information indicative of the availability of a user through the state of her communication devices, the service node 28 will recognize that telephony terminal 18A is involved in a call, and will thus store the presence information such that other users may access it to determine how to contact the user associated with telephony terminal 18A. For additional information on the use of presence information to control communications, attention is directed to U.S. application Ser. No. 10/100,703 filed Mar. 19, 2002 entitled MONITORING NATURAL INTERACTION FOR PRESENCE DETECTION; U.S. application Ser. No. 10/101,286 filed Mar. 19, 2002 entitled CUSTOMIZED PRESENCE INFORMATION DELIVERY, U.S. application Ser. No. 10/119,923 filed Apr. 10, 2002 entitled PRESENCE INFORMATION BASED ON MEDIA ACTIVITY; U.S. application Ser. No. 10/119,783 filed Apr. 10, 2002 entitled PRESENCE INFORMATION SPECIFYING COMMUNICATION PREFERENCES, and U.S. application Ser. No. 10/247,591 filed Sep. 19, 2002 entitled DYNAMIC PRESENCE INDICATORS, the disclosures of which are incorporated herein by reference in their entireties.

If the service node 28 assists in keeping track of call logs, which may be used to provide the user with information on recent incoming or outgoing calls, the service node 28 may send a SIP Notify message to media client 12A indicating that the call log should be updated to include a call to directory number DN2 (step 106). Media client 12A will update the call log to include the call to directory number DN2 as the latest outgoing call (step 108) and respond to the service node 28 with a SIP 200 OK message (step 110). The service node 28 may also control the routing of the call, and will thus instruct telephony switch 22A how to proceed with establishing and routing the call initiated from telephony terminal 18A. In this example, assume the service node 28 determines that the call should be allowed to continue toward directory number DN2. As such, the service node 28 will send a SIP 200 OK message in response to the original Sip Notify message (in step 104) toward telephony switch 22A (step 112). The SIP 200 OK message will be received by the signaling adaptor 30, which will send an IN Continue message to telephony switch 22A (step 114). The IN Continue message instructs telephony switch 22A to proceed with routing the call toward directory number DN2. As such, telephony switch 22A will send an ISUP Initial Address Message (IAM) through the PSTN 20 toward telephony switch 22B (step 116). The ISUP IAM will identify directory numbers DN1 and DN2 for the calling and called parties, respectively.

Telephony switch 22B may be provisioned to recognize that the service node 28 may control calls directed to telephony terminal 18B. As such, telephony switch 22B will send an IN Termination Attempt Trigger (TAT) toward the service node 28 to indicate a call is being routed to telephony terminal 18B. The signaling adaptor 30 will receive the IN TAT, which identifies the directory numbers for the calling and called parties (step 118), and will send a SIP Invite message to the service node 28 indicating a call is being initiated from directory number DN1 to directory number DN2 (step 120). The service node 28 will execute any service node logic used to control the routing of an incoming call to telephony terminal 18B to decide how to respond to the SIP Invite message (step 122). In this example, assume the service node 28 decides to allow the call to continue toward telephony terminal 18B, and as such, will send a SIP 302 Moved Temporarily message back toward telephony switch 22B. The SIP 302 Moved Temporarily message effectively identifies the next step for telephony switch 22B to take in routing the call. In this example, the next step is to continue routing the call toward directory number DN2. The signaling adaptor 30 will receive the SIP 302 Moved Temporarily message (step 124) and send an IN Authorize_Termination message to telephony switch 22B (step 126). The IN Authorize_Termination message instructs telephony switch 22B to establish a connection with telephony terminal 18B. Telephony switch 22B will then initiate ringing of telephony terminal 18B (step 128), as well as send an ISUP Address Complete Message (ACM) to telephony switch 22A (step 130) to indicate telephony terminal 18B is ringing.

In the meantime, the service node 28 can take the necessary steps to arm the associated media clients 12 with information sufficient to establish a media session between them. Accordingly, the service node 28 may send a SIP Invite message identifying the address of multimedia client 12A (Client A) to media client 12B, which has an address of Client B (step 132). The SIP Invite message will alert media client 12B that a voice call is being initiated from telephony terminal 18A toward its associated telephony terminal 18B. Media client 12B will respond by sending a SIP 200 OK message to the service node 28 (step 134), as well as display a message to the user indicating that a call is coming in from directory number DN1 and providing any other associated call information (step 136). Similarly, the service node 28 will send a SIP Invite message to media client 12A using address Client A to identify the address (Client B) of media client 12B, as well as providing the directory number (DN2) for telephony terminal 18B (step 138). Media client 12A will respond by sending a SIP 200 OK to the service node 28 (step 140), as well as displaying any relevant call information to the user of media client 12A (step 142). The call information may identify the called party as well as indicate that the call is in progress. Once telephony terminal 18B is answered, telephony switch 22B will receive an Offhook signal (step 144) and send an ISUP Answer Message (ANM) toward telephony switch 22A (step 146). At this point, a voice connection is established between telephony terminals 18A and 18B through telephony switches 22A and 22B (step 148).

At this point, a voice call is established between telephony terminals 18A and 18B, and media clients 12A and 12B are armed with sufficient information to initiate a media session therebetween. The media session could be set up automatically or initiated by the user. Assume that the user of media client 12B decides to initiate an application sharing session with the user of media client 12A. Upon being instructed to initiate the application sharing session, media client 12B will send a SIP Invite message toward media client 12A to initiate a media session to support application sharing. The service node 28 may act as a SIP proxy, and receive the SIP Invite message on behalf of media client 12A (step 150) and forward a like SIP Invite message to media client 12A (step 152). The SIP Invite message will include any address and port information for the respective media clients 12, as well as including an indication that the session to be established is an application sharing session. In this embodiment, the Session Description Protocol (SDP) is used to identify the session as an application sharing session. In response, media client 12A will send a SIP 200 OK message toward media client 12B. The SIP 200 OK message is received by the service node 28 (step 154), which will send a like SIP 200 OK message to media client 12B (step 156). At this point, the media clients 12A and 12B can establish an application sharing session (step 158). With the present invention, the establishment of a voice call results in automatically configuring corresponding media clients to support a media session. Once a particular media service is selected, a corresponding media session may be readily established.

When the voice call ends, the corresponding media session is cancelled. In one embodiment, the service node 28 will function to cancel the session and update presence information to indicate that the telephony terminals 18 are idle. Assume that telephony terminal 18B goes on hook, and telephony switch 22B determines that telephony terminal 18B has gone on hook (step 160). In response, telephony switch 22B will send a Termination Notification toward the service node 28. The Termination Notification is received by the signaling adaptor 30 (step 162), which will send a corresponding SIP Notify message to the service node 28 indicating that the call to directory number DN2 has been released (step 164). If the service node 28 is tracking presence information associated with telephony terminal 18B, the service node 28 may determine that telephony terminal 18B is no longer in use and send a SIP Notify message to media client 12B to indicate that telephony terminal 18B is currently idle, and that the call has been released (step 166). Media client 12B will log this information and respond with a SIP 200 OK message (step 168). In the meantime, telephony switch 22B will send an ISUP Release (REL) message toward telephony switch 22A (step 170).

Similarly, telephony switch 22A will send a Termination Notification message toward the service node 28. Again, the signaling adaptor 30 will receive the Termination Notification (step 172) and send a corresponding SIP Notify message toward the service node 28 indicating that the call from directory number DN1 has been released (step 174). As such, the service node 28 will determine the presence information for telephony terminal 18A as being idle, and send a SIP Notify message indicating that the call involving telephony terminal 18A (directory number DN1) has been released, and that telephony terminal 18A is idle (step 176). Media client 12A will log this information and respond to the service node 28 with a SIP 200 OK message (step 178).

The service node 28 will then send a SIP Bye message to media client 12A to indicate that the application sharing session between media clients 12A and 12B should end (step 180). Media client 12A will respond with a SIP 200 OK message (step 182). The service node 28 will also send a SIP Bye message to media client 12B indicating that the application sharing session between media clients 12A and 12B should end (step 184). Media client 12B will then send a SIP 200 OK message back to the service node 28 (step 186). At this point, media clients 12A and 12B will no longer support the application sharing session, which was automatically cancelled when the voice call between telephony terminals 18A and 18B was released. Therefore, the service node 28 may play a pivotal role in establishing and ending a media session in association with a voice call, provide call log information to an associated media client 12, and track and provide presence information bearing on the state of a user's telephony devices 18 or her relative availability for communications.

Figure 3:
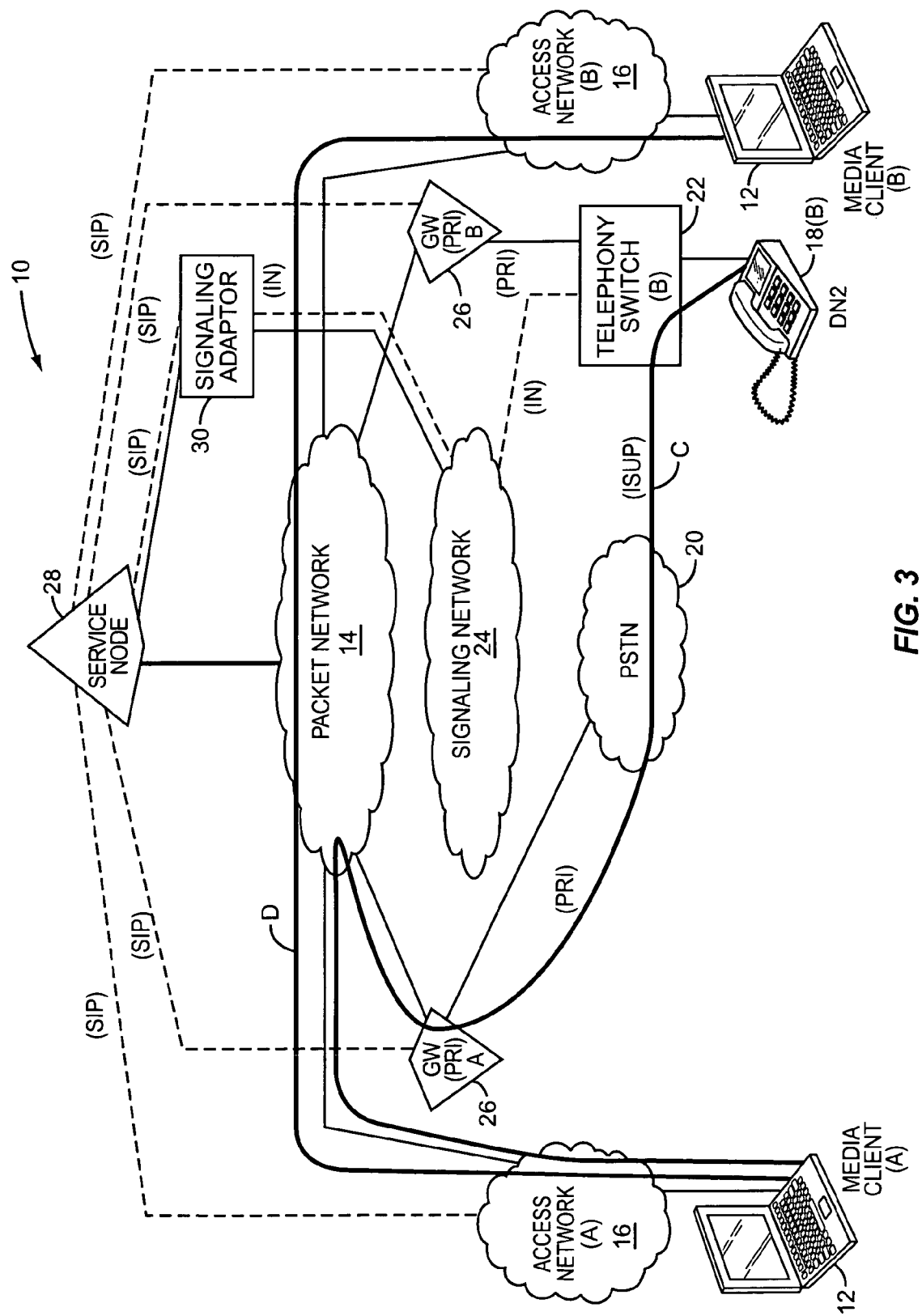

With reference to FIG. 3, a communication environment 10 is illustrated according to a second embodiment of the present invention. In this embodiment, media client 12A is capable of supporting various types of media sessions, including a voice session (C) that may be facilitated in part over the PSTN 20 and terminate at telephony terminal 18B via telephony switch 22B. Media client 12A will include a user interface to facilitate bi-directional voice communications, and as such will include a microphone and speaker and the necessary application software and hardware to support voice over packet (VoP) communications. In addition to the voice session (C) established between media client 12A and telephony terminal 18B, other media sessions (D) may be established in association with the voice session between media client 12A and media client 12B. In this example, the voice session (C) includes a packet portion and a circuit-switched portion. The packet portion is established between media client 12A and gateway 26A over access network 16A and the packet network 14, and the circuit-switched portion is established between gateway 26A and telephony terminal 18B via the PSTN 20 and telephony switch 22B. Notably, the service node 28 will interact with gateway 26A and telephony switch 22B, via the signaling adaptor 30, to establish the voice session.

Figure 4A:
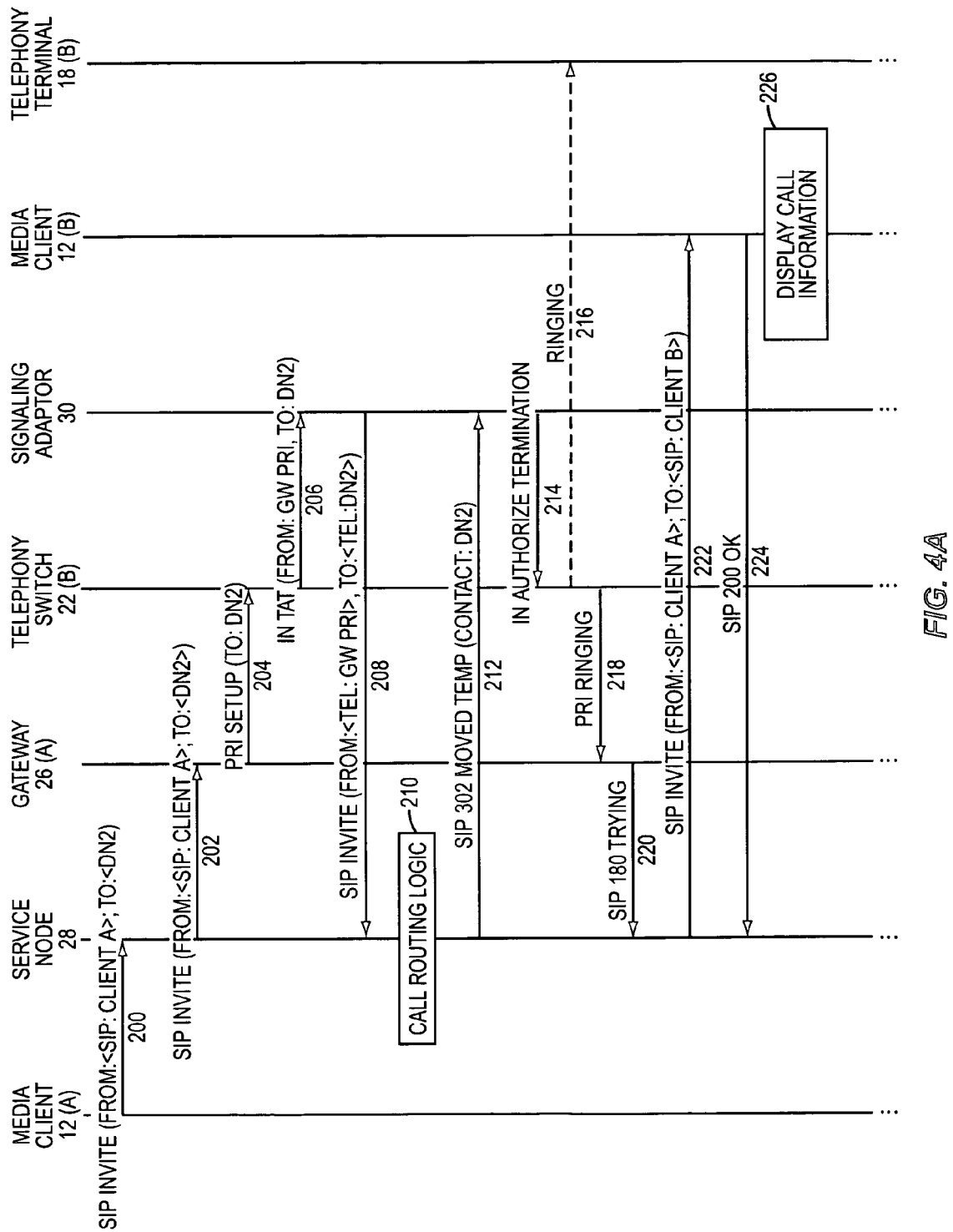
Figure 4B:
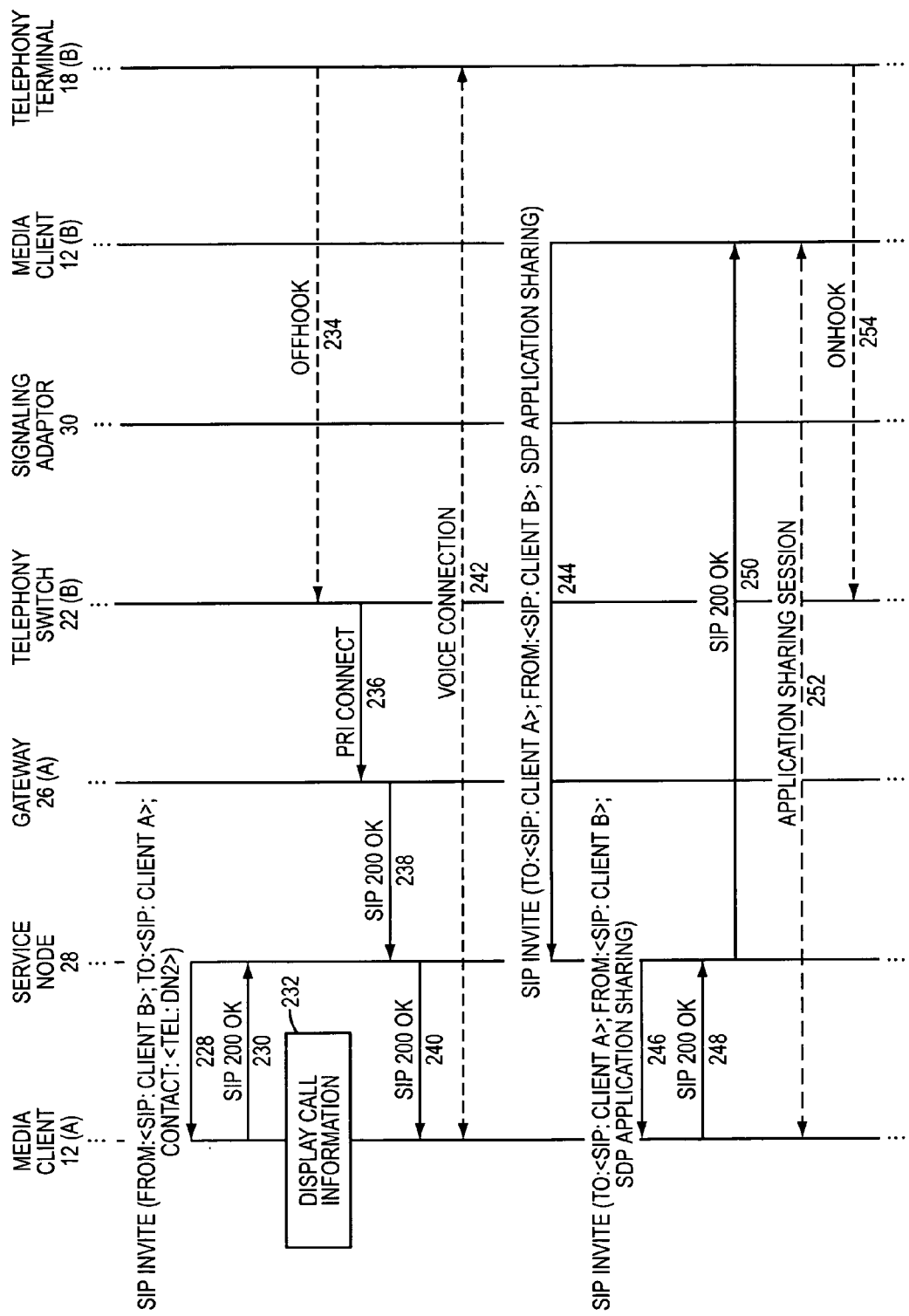

An exemplary communication flow for establishing the voice and media sessions between media client 12A and telephony terminal 18B, and media client 12A and media client 12B, respectively, is illustrated in FIGS. 4A-4C. Assume that the user of media client 12A decides to initiate a voice session between media client 12A and telephony terminal 18B. Upon receiving the appropriate instructions from the user, media client 12A will send a SIP Invite message indicating a voice session should be established from media client 12A (From Address: Client A) to directory number DN2. If the service node 28 is acting as a SIP proxy, the SIP Invite is received by the service node 28 (step 200), which will then send a like SIP Invite message to gateway 26A over the packet network 14 (step 202). Gateway 26A will then take the necessary steps to instruct telephony switch 22B to establish a circuit-switched connection to telephony terminal 18B, which is associated with directory number DN2. If gateway 26A provides a Primary Rate Interface, a PRI Setup message may be sent directly or via the PSTN to telephony switch 22B to initiate the circuit-switched connection (step 204). If the circuit-switched connection needs to transit via the PSTN, the PRI messages may be converted to corresponding ISUP messages as is well known in the art. Telephony switch 22B is again provisioned to alert the service node 28 of incoming calls to directory number DN2, and thus will send an IN TAT to the signaling adaptor 30 identifying the directory number DN2 for telephony terminal 18B and the connection information at the PRI of gateway 26A (step 206). The signaling adaptor 30 will forward a corresponding SIP Invite to the service node 28 identifying the PRI connection information for gateway 26A and directory number DN2 for telephony terminal 18B (step 208). The service node 28 will provide service node logic to determine how to route the call (step 210) and provide appropriate instruction to telephony switch 22B via the signaling adaptor 30.

In this example, assume the service node 28 does not route the call to another directory number, but simply allows the call to be terminated at telephony terminal 18B. As such, the service node 28 may send a SIP 302 Moved Temporarily message instructing telephony switch 22B to terminate the call at directory number DN2 to the signaling adaptor 30 (step 212), which will send an IN Authorize Termination message to telephony switch 22B (step 214). Telephony switch 22B will then initiate ringing of telephony terminal 18B (step 216), and send a PRI Ringing message back to gateway 26A to indicate that telephony terminal 18B is ringing (step 218). In response, gateway 26A will send a SIP 180 Trying message to the service node 28 to indicate that telephony terminal 18B is ringing (step 220).

The service node 28 will then take the necessary steps to prepare media clients 12A and 12B for a media session associated with the voice session. The service node 28 may send a SIP Invite message to media client 12B using address Client B to identify the address Client A for media client 12A (step 222). Upon receipt, media client 12B will respond with a SIP 200 OK message (step 224). Media client 12B may also display an alert to the user of media client 12B that an incoming call is being attempted at telephony terminal 18B and provide any call information associated therewith (step 226). The call information may be sent in the SIP Invite message. The service node 28 will also send a SIP Invite message to media client 12A using address Client A to provide the address Client B of media client 12B, as well as providing related call information to media client 12A (step 228). Media client 12A will send a SIP 200 OK message in response to the SIP Invite (step 230), as well as providing an alert to the user of media client 12A (step 232). The alert may provide call information pertaining to the voice session being established between media client 12A and telephony terminal 18B.

Once telephony terminal 18B is answered, telephony switch 22B will receive an Offhook signal (step 234) and will send a PRI Connect message to gateway 26A (step 236). Gateway 26A will then send a SIP 200 OK message to the service node 28 (step 238) to complete the response to the SIP Invite (sent in step 202). The service node 28 will then send a SIP 200 OK message to media client 12A (step 240) in response to the original SIP Invite (sent in step 200). At this point, a voice session is established between media client 12A and telephony terminal 18B, wherein a packet portion is established between media client 12A and gateway 26A, and a circuit-switched portion is established between gateway 26A and telephony terminal 18B (step 242).

Assume that the user of media client 12B decides to initiate an application sharing session with the user of media client 12A. Upon being instructed to initiate the application sharing session, media client 12B will send a SIP Invite message toward media client 12A to initiate a media session to support application sharing. The service node 28 may act as a SIP proxy, and receive the SIP Invite message on behalf of media client 12A (step 244) and forward a like SIP Invite message to media client 12A (step 246). The SIP Invite message will include any address and port information for the respective media clients 12, as well as including an indication that the session to be established is an application sharing session. In this embodiment, SDP is again used to identify the session as an application sharing session. In response, media client 12A will send a SIP 200 OK message toward media client 12B. The SIP 200 OK message is received by the service node 28 (step 248), which will send a like SIP 200 OK message to media client 12B (step 250). At this point, the media clients 12A and 12B can establish an application sharing session (step 252).

When the voice session comes to an end, assuming that telephony terminal 18B goes on hook, telephony switch 22B will receive an Onhook signal (step 254). Telephony switch 22B will then send a Termination Notification to the signaling adaptor 30 (step 256), which will send a SIP Notify message to the service node 28 indicating that the call to directory number DN2 has been released (step 258). The service node 28 may send a SIP Notify message to media client 12B indicating that the call to directory number DN2 has been released, and that the presence information associated with telephony terminal 18B should indicate that telephony terminal 18B is idle (step 260). Media client 12B will send a SIP 200 OK message to the service node 28 in response (step 262).

In the meantime, telephony switch 22B will send a PRI Release message to gateway 26A (step 264), which will send a SIP Bye message to the service node 28 (step 266). The service node 28 will then send a SIP Bye message to media client 12A (step 268). Media client 12A will send a SIP 200 OK message back to the service node 28 (step 270), which will in turn send a SIP 200 OK message to gateway 26A (step 272), wherein the packet and circuit-switched portions of the voice session are ended. The service node 28 will then send a SIP Bye message to media client 12A to indicate that the application sharing session between media clients 12A and 12B should end (step 274). Media client 12A will respond with a SIP 200 OK message (step 276). The service node 28 will also send a SIP Bye message to media client 12B indicating that the application sharing session between media clients 12A and 12B should end (step 278). Media client 12B will then send a SIP 200 OK message back to the service node 28 (step 280).

Accordingly, the present invention may also facilitate the establishment and association of media sessions from one media client to multiple endpoints, wherein one endpoint may support a voice session and other endpoints may support other types of media sessions. Those skilled in the art will recognize that with any of the above embodiments, media sessions may be established prior to a voice session being established, under the control of the service node 28.

Given the significant flexibility in controlling call routing using a service node 28, another embodiment of the present invention facilitates the transfer of call control from a traditional entity in the signaling network 24 to the service node 28, such that more advanced call processing functionality can be implemented. The service node 28 may provide logic to control forwarding or rerouting of calls, in a virtually unlimited fashion in light of rules established by the telephony subscriber. Examples of such call routing may be found in the following co-assigned U.S. applications: Ser. No. 10/409,280, entitled INTEGRATED WIRELINE AND WIRELESS SERVICE, filed Apr. 8, 2003; Ser. No. 10/409,290, entitled CALL TRANSFER FOR AN INTEGRATED WIRELINE AND WIRELESS SERVICE, filed Apr. 8, 2003; Ser. No. 10/626,677, entitled INTEGRATED WIRELINE AND WIRELESS SERVICE USING A COMMON DIRECTORY NUMBER, filed Jul. 24, 2003; Ser. No. 60/472,277, entitled WLAN CALL HANDOFF TO WIRELESS USING DYNAMICALLY ASSIGNED TEMPORARY NUMBER, filed May 21, 2003; and Ser. No. 60/472,152, entitled HANDOFF FROM CELLULAR NETWORK TO WLAN NETWORK, filed May 21, 2003; Ser. No. 10/723,978 filed Nov. 26, 2003 entitled AUTOMATIC CONTACT INFORMATION DETECTION; and Ser. No. 10/723,831 filed Nov. 26, 2003 entitled CALL TRANSFER FOR AN INTEGRATED PACKET AND WIRELESS SERVICE USING A TEMPORARY DIRECTORY NUMBER.

Figure 5:
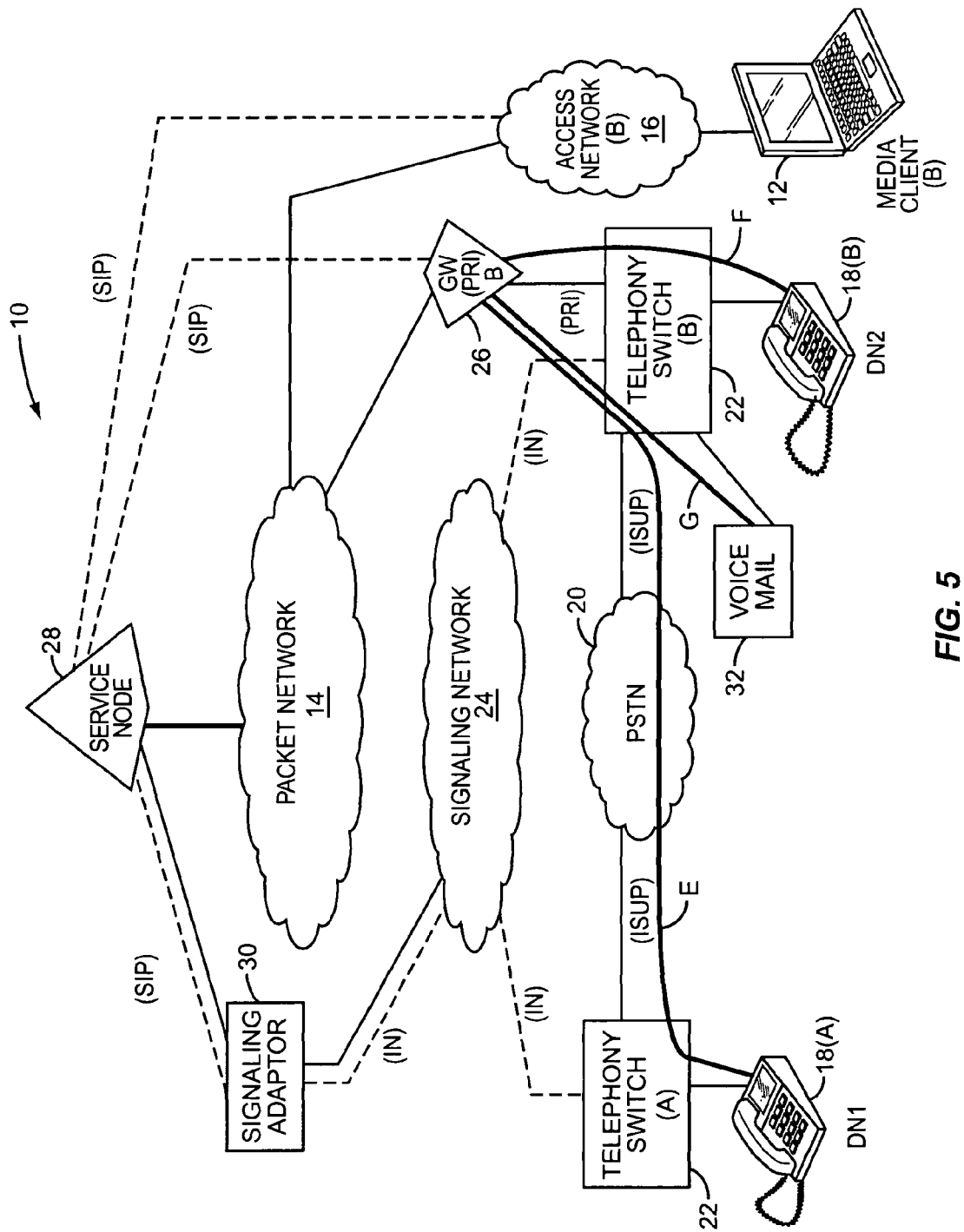

With reference to FIG. 5, a communication environment 10 is illustrated according to a third embodiment of the present invention. In this embodiment, a significant portion of call routing control is transferred to the service node 28, wherein the service node 28 cooperates with gateway 26B to selectively route an incoming call to a desired destination according to a predefined set of rules implemented by the service node 28. In the following example, a call is initiated from telephony terminal 18A to telephony terminal 18B. When the incoming call is received at telephony switch 22B, control of the call is transferred to the service node 28 by routing the call through gateway 26B (E). From gateway 26B, the service node 28 will initially attempt to terminate the call at telephony terminal 18B (F), and if the call is not answered within a certain number of rings, the service node 28 will have the call forwarded to a voicemail system 32 (G). Those skilled in the art will recognize that once control of the call is transferred to the service node 28 via gateway 26B, the call could be routed to any endpoint according to any defined set of rules, wherein multiple endpoints may be rung sequentially or simultaneously, where the first endpoint to be answered will have the call routed thereto.

Figure 6A:
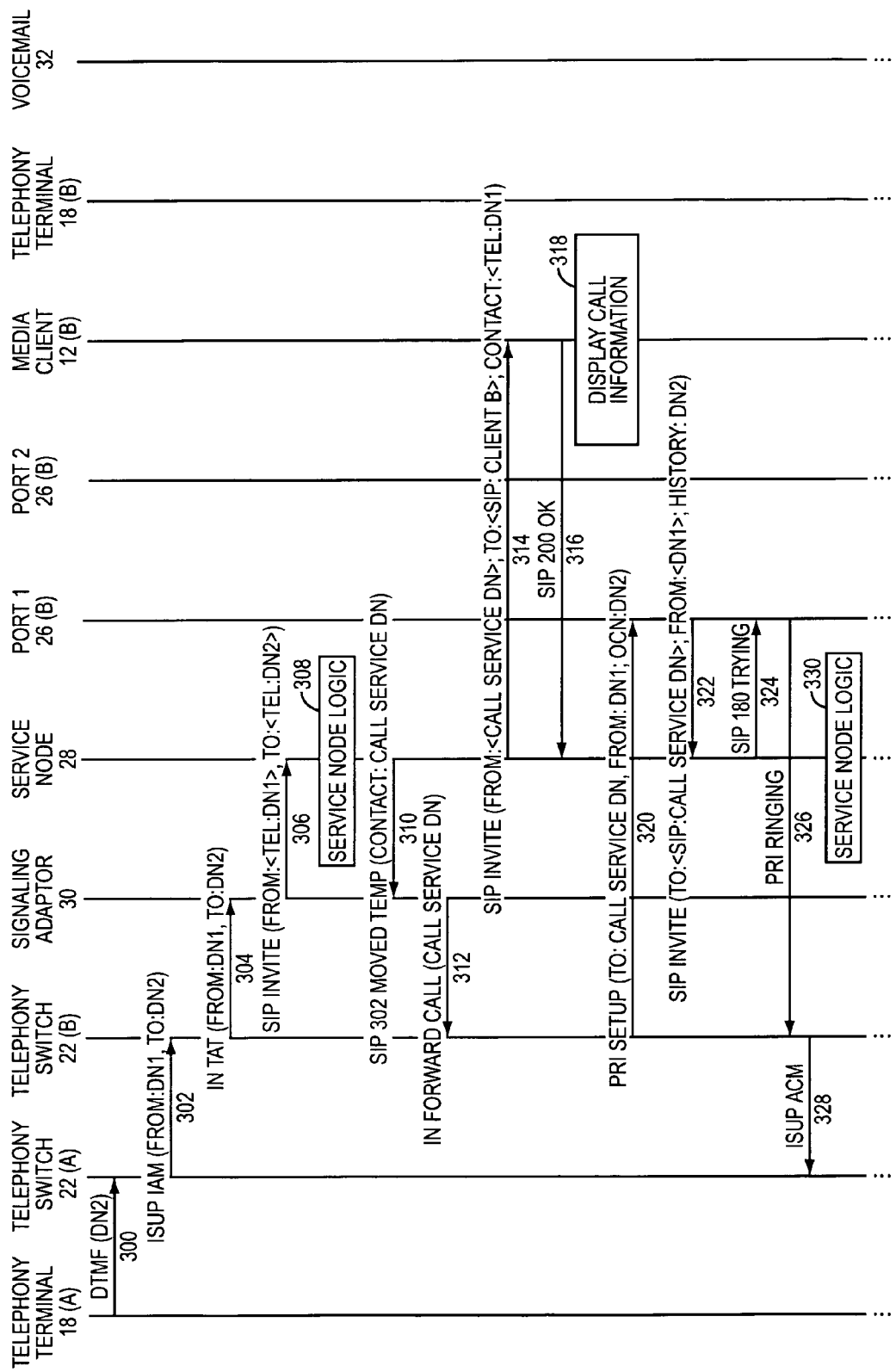
Figure 6B:
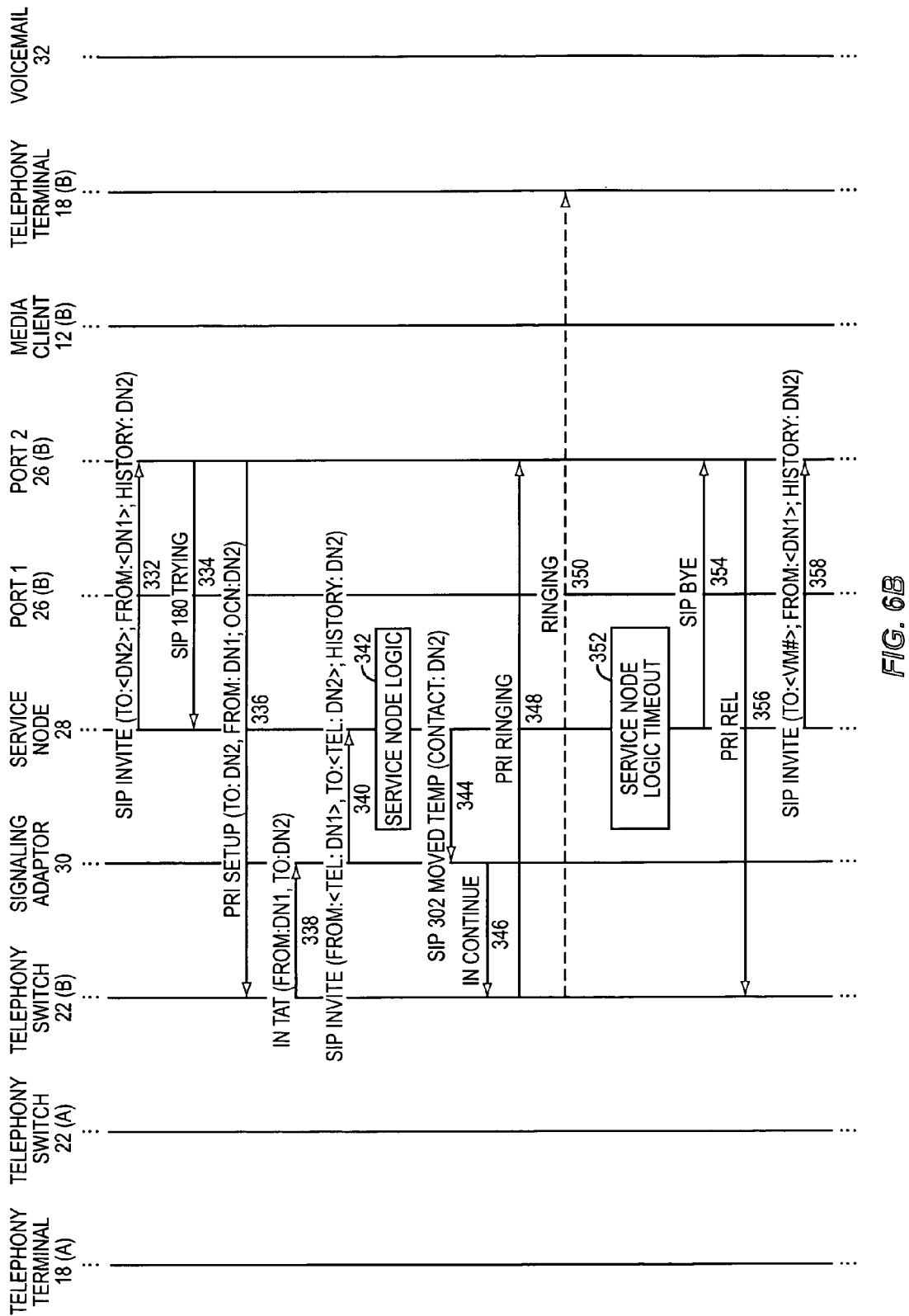
Figure 6C:
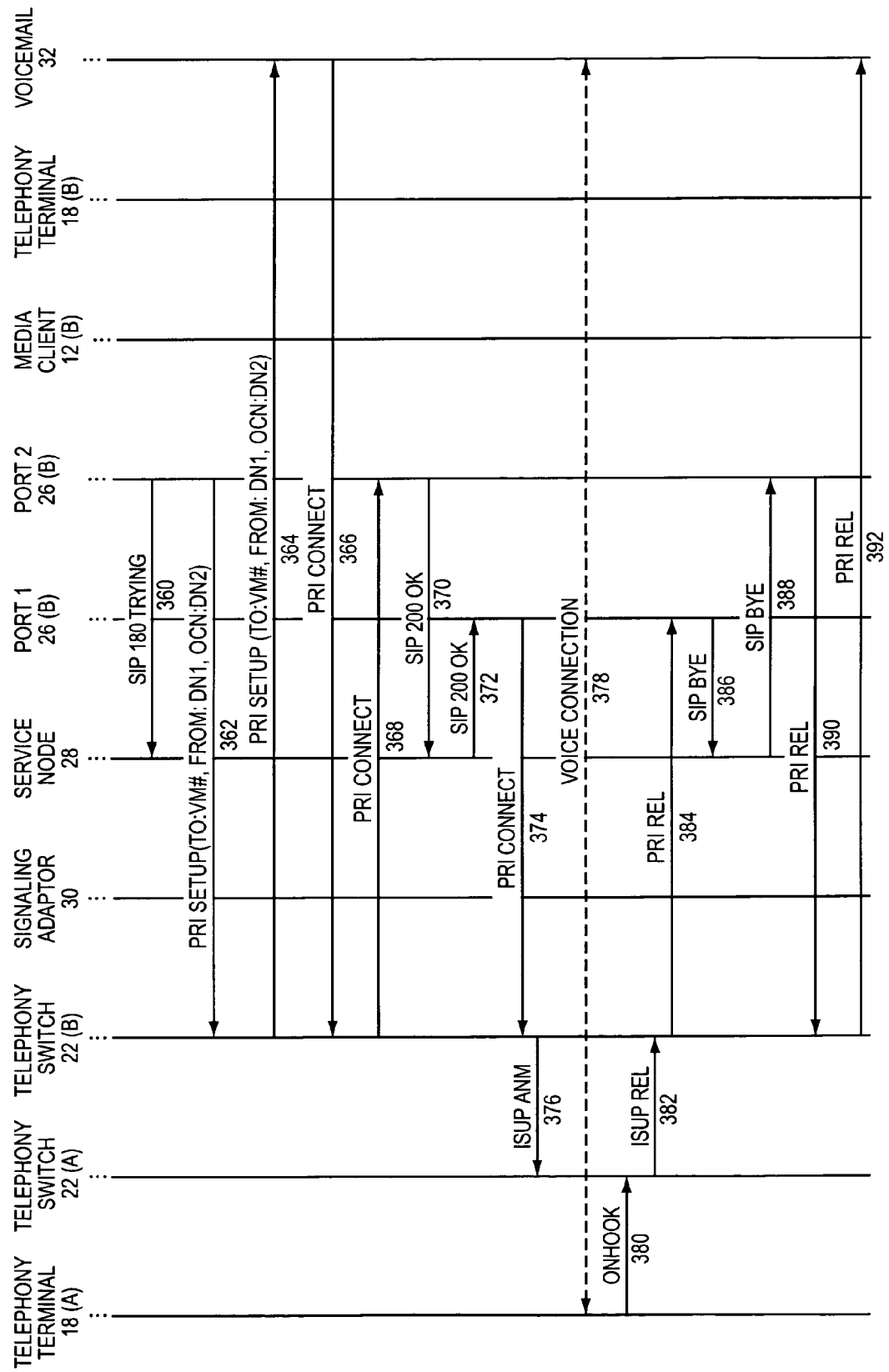

Turning now to FIGS. 6A-6C, a communication flow is provided wherein call routing control is transferred to the service node 28, and the incoming call is initially routed to telephony terminal 18B for a select number of rings, and if unanswered, is forwarded to the voicemail system 32. Initially, telephony switch 22A will receive the DTMF digits corresponding to directory number DN2 from telephony terminal 18A to indicate a call is being initiated to telephony terminal 18B (step 300). Telephony switch 22A will send an ISUP IAM to telephony switch 22B indicating that a call is being initiated from directory number DN1 to directory number DN2 (step 302). Telephony switch 22B will recognize that the service node 28 should handle call processing for calls intended for directory number DN2, and will send an IN TAT toward the service node 28 via the signaling adaptor 30. The IN TAT will identify the directory numbers for telephony terminals 18A and 18B. The signaling adaptor 30 will receive the IN TAT (step 304) and send a SIP Invite message to the service node 28 indicating a voice call is being attempted between directory numbers DN1 and DN2 (step 306). The service node 28 will provide service node logic to process the call (step 308) and will recognize that a complex call routing ruleset is in place for telephony terminal 18B. As such, the service node 28 will determine to instruct telephony switch 22B to forward the call to gateway 26B to effect the complex call routing ruleset.

For simplicity, "call service" is used to refer to the overall process for implementing the complex call routing ruleset. Further, the call service will be associated with a call service directory number at gateway 26B. For the service node 28 to effectively control call processing according to this embodiment, the incoming call will be forwarded to the call service using the call service directory number, which is associated with gateway 26B. To effect the transfer, the service node 28 will send a SIP 302 Moved Temporarily message including the call service directory number to the signaling adaptor 30 (step 310), which will send an IN Forward Call message to telephony switch 22B instructing telephony switch 22B to forward the incoming call to the call service directory number (step 312). In the meantime, the service node 28 may be configured to send a SIP Invite message to media client 12B to provide information indicating that an incoming call from telephony terminal 18A is being attempted to telephony terminal 18B (step 314). Media client 12B may respond with a SIP 200 OK message (step 316), as well as displaying any call information associated with the incoming call to the user of media client 12B (step 318).

Upon receiving the IN Forward Call message (in step 312), telephony switch 22B will send a PRI Setup message to the call service directory number associated with gateway 26B (step 320). The PRI Setup message will also identify the directory number DN1 for telephony terminal 18A and the originally called number (OCN) directory number DN2. Notably, the PRI Setup message is used to establish any connection between telephony switch 22A and a first port (Port 1) of gateway 26B. Gateway 26B will send a SIP Invite message to the service node 28 to indicate a connection is being established from directory number DN1 to the call service directory number at gateway 26B (step 322). The SIP Invite message will also identify in a History field the directory number DN2 for telephony terminal 18B. The service node 28 will respond by sending a SIP 180 Trying message to gateway 26B (step 324), which will send a PRI Ringing message to telephony switch 22B (step 326) which will send an ISUP ACM to telephony switch 22A (step 328).

In the meantime, the service node 28 will use service node logic to determine how to route the call (step 330). In this example, the service node logic dictates that the call should be routed to telephony terminal 18B as originally intended, and the service node 28 will send a SIP Invite message to gateway 26B in association with a second port on gateway 26B (Port 2) (step 332). Gateway 26B will respond with a SIP 180 Trying message (step 334). For Port 2 of gateway 26B, a PRI Setup message is sent to telephony switch 22B to route the call to telephony terminal 18B using directory number DN2 (step 336). The PRI Setup message will also include the directory number DN1 of the originating telephony terminal 18A and the OCN information indicating that the call was originally intended for directory number DN2. Telephony switch 22B will recognize an incoming call intended for directory number DN2, and will again check with the service node 28 for routing instructions. Accordingly, an IN TAT is sent to the signaling adaptor 30 identifying the directory numbers for telephony terminal 18A and 18B, as well as the OCN information (step 338). The signaling adaptor 30 will send a SIP Invite message to the service node 28 indicating that a call is being attempted from directory number DN1 to directory number DN2, and that the call was originally intended for directory number DN2 (step 340). The service node 28 will again provide service node logic to process the call (step 342) and will determine that the call should be routed to directory number DN2. As such, the service node 28 will send a SIP 302 Moved Temporarily message, identifying directory number DN2 as the directory number to which the call should be routed, to the signaling adaptor 30 (step 344), which will forward an IN Continue message to telephony switch 22B (step 346). Telephony switch 22B will send a PRI Ringing message to Port 2 of gateway 26B (step 348), and initiate ringing of telephony terminal 18B (step 350).

Assume the service node logic dictates that if the call to telephony terminal 18B is not answered within N rings, the call should be routed to the voicemail system 32. Accordingly, the service node logic may initiate a timer, which will expire in a time period corresponding to the N number of rings if it does not receive indication that the call has been answered. Assume that the call is not answered, and that the timer initiated by the service node logic expires (step 352). The service node 28 will then send a SIP Bye message to Port 2 of gateway 26B (step 354), which will send a PRI Release message to telephony switch 22B (step 356) to end the attempt to terminate the call at telephony terminal 18B. The service node 28 will then send a SIP Invite message instructing gateway 26B to establish a connection to the voicemail system 32 via Port 2 (sep 358). The SIP Invite message will identify the directory number associated with the voicemail system 32 (VM#), as well as indicate the call was originated from directory number DN1 and originally intended for directory number DN2.

Gateway 26B will respond with a SIP 180 Trying message (step 360), and send a PRI Setup message from Port 2 to telephony switch 22B (step 362). The PRI Setup message will identify the voicemail directory number VM#, the originating directory number DN1, and the OCN information identifying directory number DN2 as the originally called number. Telephony switch 22B will then send a PRI Setup message to the voicemail system directory number VM# (step 364). Again, the PRI Setup message will identify the originating directory number DN1 and the originally called number DN2. The voicemail system 32 will receive the PRI Setup message and respond with a PRI Connect message, which is sent back to telephony switch 22B (step 366). Telephony switch 22B will send a PRI Connect message to Port 2 of gateway 26B (step 368), which will send a SIP 200 OK message back to the service node 28 (step 370). The SIP 200 OK message is in response to the SIP Invite message sent in step 358. The service node 28 will then send a SIP 200 OK message to Port 1 of gateway 26B (step 372), which will send a PRI Connect message to telephony switch 22B (step 374). Telephony switch 22B will then send an ISUP ANM to telephony switch 22A (step 376), wherein a voice connection is established between telephony terminal 18A and the voicemail system 32 through telephony switch 22A, telephony switch 22B, and ports 1 and 2 of gateway 26B (step 378).

Once the voicemail message has been left in the voicemail system 32 in association with a mailbox for the user of telephony terminal 18B, the user will hang up telephony terminal 18A, which will result in telephony switch 22A recognizing that telephony terminal 18A has gone on hook (step 380). Telephony switch 22A will send an ISUP Release message to telephony switch 22B (step 382), which will send a PRI Release message to Port 1 of gateway 26B (step 384). In association with Port 1, gateway 26B will send a SIP Bye message to the service node 28 (step 386), which will send a SIP Bye message to Port 2 of gateway 26B (step 388). Accordingly, Port 2 of gateway 26B will send a PRI Release message back to telephony switch 22B (step 390), which will send a PRI Release message to the voicemail system 32 (step 392). At this point, all connections between telephony terminal 18A and the voicemail system 32 are released.

From the above, the third embodiment of the present invention allows the service node 28 to effectively transfer a call to a gateway 26B to facilitate advanced call processing, which may include implementing rules to control call forwarding, call routing, and the like. By transferring the call to the gateway 26B, the service node 28 can directly interact with the gateway 26B to implement the call routing and control logic for a given user.

Figure 7:
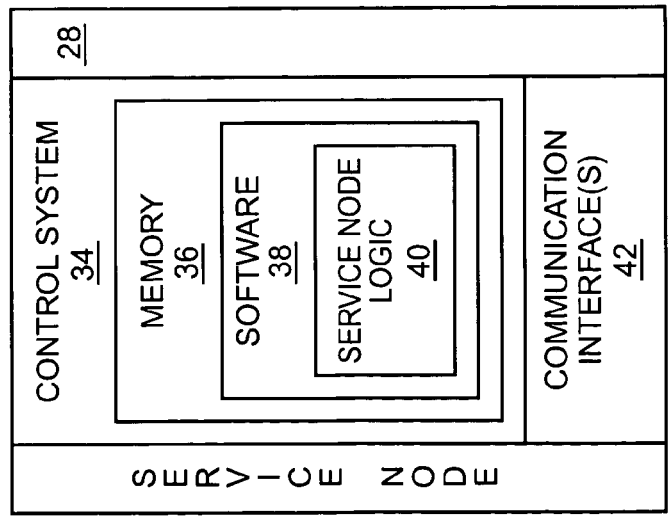
FIG. 7 is a block representation of a service node according to one embodiment of the present invention.

With reference to FIG. 7, a block representation of a service node 28 is illustrated according to one embodiment of the present invention. The service node 28 may include a control system 34 having memory 36 with software 38 sufficient to provide the functionality described above. In particular, the software 38 will include service node logic 40 capable of supporting the association of voice and media sessions, call routing, or a combination thereof. The control system 34 will be associated with one or more communication interfaces 42 to facilitate communications with the media clients 12, gateways 26, and telephony switches 22, directly or indirectly via the signaling adaptor 30. Those skilled in the art will recognize that the service node functionality can be implemented in a standalone device or integrated with other entities on the packet network 14 or PSTN 20, such as within the telephony switches 22.

Figure 8:
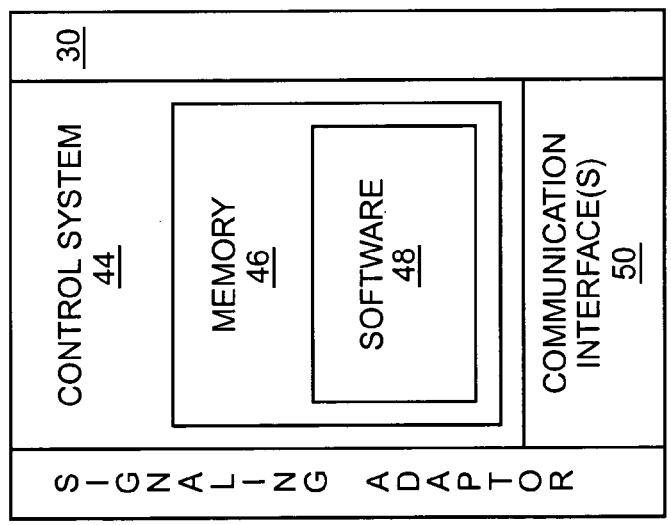
FIG. 8 is a block representation of a signaling adaptor according to one embodiment of the present invention.

With reference to FIG. 8, a signaling adaptor 30 is illustrated according to one embodiment of the present invention. The signaling adaptor 30 may include a control system 44 with memory 46 having sufficient software 48 to implement the functionality described above. The control system 44 will also be associated with one or more communication interfaces 50 to facilitate communications with the service node 28 and the telephony switches 22 or other entities in the signaling network 24.

Figure 9:
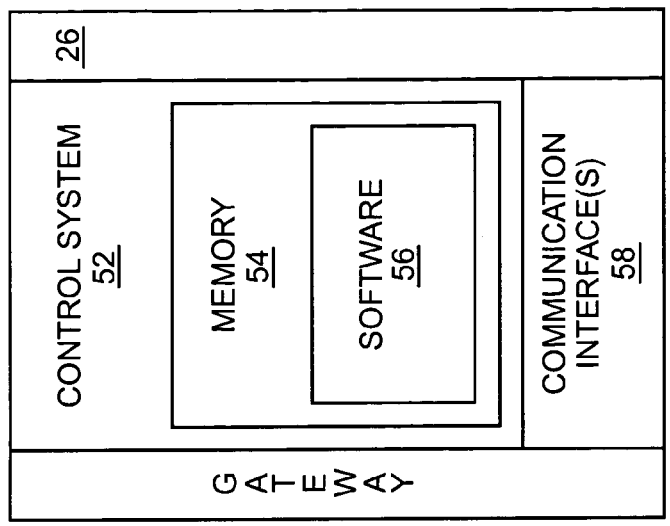
FIG. 9 is a block representation of a gateway according to one embodiment of the present invention.

Turning now to FIG. 9, a gateway 26 is illustrated according to one embodiment of the present invention. The gateway 26 may have a control system 52 with memory 54 having sufficient software 56 to implement the functionality described above. The control system 52 will be associated with one or more communication interfaces 58 to facilitate communications over the packet network 14 as well as over the PSTN 20 or with the telephony switches 22.

Those skilled in the art will recognize improvements and modifications to the preferred embodiments of the present invention. All such improvements and modifications are considered within the scope of the concepts disclosed herein and the claims that follow.

What is claimed is:

1. A method comprising:
a) receiving a first message indicating a call is being established from a first terminal;
b) sending a second message to establish the call with a second terminal;
c) sending a third message to provide information to establish a media session associated with the call, wherein the third message is sent over a packet network; and
d) determining a state of at least one of the first and second terminals based on the call and providing presence information to a media client associated with one of the first and second terminals based on the state of the at least one of the first and second terminals.

2. The method of claim 1,
wherein the second message is sent to a signaling adaptor, which forwards a connect message to a telephony switch supporting the second terminal in response to the second message.

3. The method of claim 1 wherein the second message is a session initiation protocol message and the connect message is an intelligent network protocol message.

4. The method of claim 1 further comprising determining to route the call to the second terminal based on call routing logic defined by a user associated with the second terminal.

5. The method of claim 4 wherein the first message indicates the call is intended for the second terminal.

6. The method of claim 4 wherein the first message indicates the call is intended for a third terminal.

7. The method of claim 1 wherein the third message is directed to a media client associated with the second terminal such that the media session can be established with the media client.

8. The method of claim 1 wherein the third message is directed to a media client associated with the first terminal such that the media session can be established with the media client.

9. The method of claim 8 wherein the first terminal and the media client are integrated on one communication device.

10. The method of claim 1 wherein the media session is automatically initiated.

11. The method of claim 1 wherein the media session is manually initiated.

12. The method of claim 1 wherein the third message is directed to a first media client associated with the first terminal and further comprising sending a fourth message to provide information to establish the media session to a second media client associated with the second terminal, such that the media session can be established between the first media client and the second media client.

13. The method of claim 1 further comprising sending call log information to a media client associated with at least one of the first and second terminals.

14. The method of claim 1 wherein the call is established at least in part over a public switched telephone network.

15. The method of claim 1 wherein the call is established at least in part over the packet network.

16. The method of claim 1 wherein the first terminal is associated with a first media client and the second terminal is associated with a second media client, the method further comprising receiving a session initiation message from one of the first and second media clients and sending a proxied session initiation message to another of the first and second media clients to initiate the media session.

17. The method of claim 1 further comprising
a) receiving a fourth message indicating the call is ending; and
b) sending a fifth message to a media client associated with one of the first and second terminals to end the media session.

18. A system comprising:
a) at least one communication interface; and
b) a control system associated with the at least one communication interface and adapted to:
i) receive a first message indicating a call is being established from a first terminal;
ii) send a second message to establish the call with a second terminal; and
iii) send a third message to provide information to establish a media session associated with the call, wherein the third message is sent over a packet network; and
iv) determine to route the call to the second terminal based on call routing logic defined by a user associated with the second terminal, wherein the second message is sent to a signaling adaptor, which forwards a connect message to a telephony switch supporting the second terminal in response to the second message.

19. The system of claim 18 wherein the first message is received from the signaling adaptor, which sent the first message in response to an origination message from the telephony switch supporting the first terminal.

20. The system of claim 19 wherein the first message is a session initiation protocol message and the origination message is an intelligent network protocol message.

21. The system of claim 18 wherein the second message is a session initiation protocol message and the connect message is an intelligent network protocol message.

22. The system of claim 18 wherein the first message indicates the call is intended for the second terminal.

23. The system of claim 18 wherein the first message indicates the call is intended for a third terminal.

24. The system of claim 18 wherein the media session is automatically initiated.

25. The system of claim 18 wherein the media session is manually initiated.

26. The system of claim 18 wherein the third message is directed to a media client associated with the second terminal such that the media session can be established with the media client.

27. The system of claim 18 wherein the third message is directed to a media client associated with the first terminal such that the media session can be established with the media client.

28. The system of claim 27 wherein the first terminal and the media client are integrated on one communication device.

29. The system of claim 18 wherein the third message is directed to a first media client associated with the first terminal and the control system is further adapted to send a fourth message to provide information to establish the media session to a second media client associated with the second terminal, such that the media session can be established between the first media client and the second media client.

30. The system of claim 18 wherein the control system is further adapted to send call log information to a media client associated with at least one of the first and second terminals.

31. The system of claim 18 wherein the call is established at least in part over a public switched telephone network.

32. The system of claim 18 wherein the call is established at least in part over the packet network.

33. A system comprising:
a) at least one communication interface; and
b) a control system associated with the at least one communication interface and adapted to:
i) receive a first message indicating a call is being established from a first terminal;
ii) send a second message to establish the call with a second terminal;
iii) send a third message to provide information to establish a media session associated with the call, wherein the third message is sent over a packet network; and
iv) determine a state of at least one of the first and second terminals based on the call and provide presence information to a media client associated with one of the first and second terminals based on the state of the at least one of the first and second terminals.

34. The system of claim 18 wherein the first terminal is associated with a first media client and the second terminal is associated with a second media client, and the control system is further adapted to receive a session initiation message from one of the first and second media clients and send a proxied session initiation message to another of the first and second media clients to initiate the media session.

35. The system of claim 18 wherein the control system is further adapted to:
a) receive a fourth message indicating the call is ending; and
b) send a fifth message to a media client associated with one of the first and second terminals to end the media session.

* * * * *